(12) United States Patent
Roorda

(10) Patent No.: US 9,252,910 B2
(45) Date of Patent: Feb. 2, 2016

(54) EXPANDABLE MULTICAST OPTICAL SWITCH

(71) Applicant: Lumentum Operations LLC, Milpitas, CA (US)

(72) Inventor: Peter David Roorda, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 17 days.

(21) Appl. No.: 14/102,814

(22) Filed: Dec. 11, 2013

(65) Prior Publication Data

US 2014/0161454 A1    Jun. 12, 2014

Related U.S. Application Data

(60) Provisional application No. 61/736,058, filed on Dec. 12, 2012.

(51) Int. Cl.
*H04B 10/00*    (2013.01)
*H04J 14/02*    (2006.01)
*H04Q 11/00*    (2006.01)

(52) U.S. Cl.
CPC ......... *H04J 14/0212* (2013.01); *H04J 14/0209* (2013.01); *H04J 14/0219* (2013.01); *H04Q 11/0005* (2013.01); *H04Q 2011/0047* (2013.01); *H04Q 2011/0052* (2013.01)

(58) Field of Classification Search
USPC .................................................. 398/40–57
See application file for complete search history.

(56) References Cited

U.S. PATENT DOCUMENTS

| | | | |
|---|---|---|---|
| 6,850,515 B2 * | 2/2005 | Chang et al. | 370/352 |
| 8,457,497 B2 * | 6/2013 | Zhong et al. | 398/83 |
| 8,891,914 B2 * | 11/2014 | Ticknor et al. | 385/17 |
| 2003/0210870 A1 * | 11/2003 | Graves | 385/71 |
| 2004/0234262 A1 * | 11/2004 | Bortz | 398/45 |
| 2005/0117908 A1 * | 6/2005 | Castanon et al. | 398/85 |
| 2008/0002974 A1 | 1/2008 | Zhong et al. | 398/48 |
| 2009/0067845 A1 | 3/2009 | Zhong et al. | 398/83 |
| 2009/0232497 A1 * | 9/2009 | Archambault et al. | 398/50 |
| 2010/0027535 A1 * | 2/2010 | Yang et al. | 370/388 |
| 2010/0086306 A1 * | 4/2010 | D'Alessandro et al. | 398/79 |
| 2010/0129082 A1 * | 5/2010 | Zhong et al. | 398/83 |
| 2010/0272441 A1 * | 10/2010 | Boduch et al. | 398/83 |
| 2011/0286746 A1 * | 11/2011 | Ji et al. | 398/83 |
| 2013/0108215 A1 * | 5/2013 | Ticknor et al. | 385/17 |
| 2014/0161454 A1 * | 6/2014 | Roorda | 398/68 |
| 2014/0270760 A1 * | 9/2014 | Xu et al. | 398/45 |
| 2015/0036971 A1 * | 2/2015 | Way et al. | 385/17 |
| 2015/0055952 A1 * | 2/2015 | Younce et al. | 398/48 |

* cited by examiner

*Primary Examiner* — Agustin Bello
(74) *Attorney, Agent, or Firm* — Harrity & Harrity, LLP

(57) ABSTRACT

A scalable multicast M×N optical switch (MCS) includes a non-scalable MCS having a plurality of (L+1)×1 selector switches east coupled at one of its L entrance ports to egress ports of the non-scalable MCS, the remaining L−1 entrance ports being coupled to an L*N upgrade ports, where M and N are integers ≥2, and L is an integer ≥1. This allows the scalable MCS to be cascaded in a daisy-chain fashion, providing scalability from the M common ports to L*M common ports. In another embodiment, the selector switches are integrated into the MCS, providing scalability of common MCS ports.

15 Claims, 12 Drawing Sheets

EXPANDABLE MULTICAST OPTICAL SWITCH

CROSS-REFERENCE TO RELATED APPLICATIONS

The present invention claims priority from U.S. Patent Application No. 61/736,058 filed Dec. 12, 2012, which is incorporated herein by reference.

TECHNICAL FIELD

The present invention relates to optical network equipment, and in particular to optical network switching and routing equipment.

BACKGROUND OF THE INVENTION

In a wavelength division multiplexed (WDM) optical network, optical signals at a plurality of wavelengths are encoded with digital streams of information. These encoded optical signals, or "wavelength channels", are combined together and transmitted through a series of spans of optical fiber in a WDM fiberoptic network. At a receiver end of a transmission link, the wavelength channels are detected by optical receivers. To that end, the wavelength channels can be separated for individual detection, or they can be detected by coherent receivers having internal oscillators tunable to a wavelength channel of interest.

In a reconfigurable WDM optical network, wavelength channels can be added or dropped at network nodes. From the optical architecture standpoint, it is preferable that any wavelength channel can be added or dropped to any add/drop port, independent of the wavelength of a wavelength channel being dropped or added. To provide this "colorless" add/drop functionality, multicast optical switches (MCS) are used.

Referring to FIG. 1, a prior-art 8×16 MCS 100 includes eight input optical fibers 102, eight optical splitters 104 coupled one-to-one to the eight input optical fibers 102, and sixteen 8×1 selector switches 106 coupled one-to-one to sixteen output optical fibers 108. Each of the optical splitters 104 splits an optical signal supplied by its input optical fiber 102. The split optical signal is coupled to each selector switch 106.

By way of example, an optical signal 110, carrying a plurality of wavelength channels, arrives at e.g. the leftmost optical splitter 104, which then splits the optical signal 110 into sixteen portions 110A, thereby "multicasting" the optical signal 110 to each 8×1 selector switch 106. Due to the multicasting, the optical signal 110 can be dropped at any output optical fiber 108, regardless of the wavelength channel(s) it carries. For example, for the multicast optical signal 110 to be received at the rightmost output fiber 108, the corresponding rightmost 8×1 selector switch 106 selects a corresponding link 112 between the leftmost optical splitter 104 and the rightmost 8×1 selector switch 106 to be coupled to the rightmost output fiber 108. The direction of traveling of the optical signal 110 in the MCS 100 corresponds to a "drop" configuration, but the MCS 100 is optically bidirectional, and for "add" application the optical signal 110 can propagate in the opposite direction.

Since the optical splitting by the optical splitters 104 is "colorless", that is, not dependent on wavelength, the MCS 100 is "colorless", that is, its operation does not depend on the wavelength channels being added or dropped. The colorless feature is advantageous over previous prior art systems, in which certain wavelength channels could only be dropped or added at particular locations equipped with corresponding wavelength-selective optical filters. Another important aspect of the MCS 100 is that it is "contentionless", that is, same wavelength channels may be coupled to multiple common ports of the same MCS 100 for independent routing to different drop ports, without blocking.

Although the colorless and contentionless feature of the prior-art MCS 100 is very useful, a key problem of the MCS 100 is that it is fixed in total port count. The MCS 100 has eight input fibers 102 and sixteen output fibers 108, but in an optical network, the number of directions at a network node varies due to the topology of the network. Therefore, at some locations, many of the input fibers 102 of the MCS 100 would remain unused, resulting in a high initial cost of deployment. Furthermore, if the number of directions grows in the future beyond the number of MCS 100 input optical fibers 102, the blocking will indeed occur. To overcome the blocking problem, costly and service-interrupting re-installation of a larger port count MCS would be required. Due to the extremely high optical data transfer speeds, even a brief service interruption can be very costly to the service provider.

SUMMARY OF THE INVENTION

In accordance with the invention, the scalability shortcomings of the conventional approach are addressed by introducing upgrade ports to MCS, enabling cost-effective and non-interruptive scaling of MCS from a low number of common ports to a higher number of common ports.

In accordance with the invention, there is provided an expandable M×N multicast optical switch comprising:

M common ports, N add/drop ports, and L*N upgrade ports, wherein M and N are integers ≥2, and L is an integer ≥1;

a non-expandable M×N multicast optical switch having M ingress ports each coupled to a unique one of the M common ports, and N egress ports; and N (L+1)×1 optical couplers each having L+1 entrance ports and one exit port, wherein each one of the optical couplers has one of the entrance ports coupled to a unique one of the N egress ports, and the exit port coupled to a unique one of the N add/drop ports;

wherein each one of the remaining L entrance ports of the N optical couplers is coupled to a unique one of the L*N upgrade ports.

In accordance with the invention, there is further provided an expandable M×N multicast optical switch comprising:

M common ports, N add/drop ports, and L*N upgrade ports, wherein M and N are integers ≥2, and L is an integer ≥1;

N (M+L)×1 selector optical switches each having M+L entrance ports, and an exit port coupled to a unique one of the N add/drop ports; and an optical splitter coupled to the M common ports, for coupling each of the M common ports to a unique entrance port of each one of the N (M+L)×1 selector optical switches;

wherein each of the remaining L entrance ports of each of the N selector optical switches is coupled to a unique one of the L*N upgrade ports.

In accordance with another aspect of the invention, there is further provided a reconfigurable optical add/drop multiplexor comprising:

first and second expandable M×N multicast optical switches; and first and second 1×(M+1) input wavelength-selective optical switches, and first and second (M+1)×1 output wavelength-selective optical switches;

wherein one of the M+1 output ports of the first input wavelength-selective optical switch is coupled to one of the M+1 input ports of the first output wavelength-selective optical switch, and one of the M+1 output ports of the second input wavelength-selective optical switch is coupled to one of the M+1 input ports of the second output wavelength-selective optical switch;

wherein a first one of the remaining M output ports of the first and second input wavelength-selective optical switches is coupled to first and second of the M common ports of the first expandable M×N multicast optical switch, respectively; and wherein a first one of the remaining M output ports of the first and second output wavelength-selective optical switches is coupled to first and second of the M common ports of the second expandable M×N multicast optical switch, respectively.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Throughout the specification, whenever an "A×B" multiport optical device is described, the terms "input port(s)" or "ingress port(s)" or "entrance port(s)" of the multiport optical device refer to the A ports, and the terms "output port(s)" or "egress port(s)" or "exit port(s)" refer to B ports, without implying the actual direction of light propagation within the device. Optical switches and couplers described herein are bidirectional. Thus, the terms "input" and "output", "ingress" and "egress", "entrance" and "exit" are not limiting the direction of propagation of light. These terms are used merely for convenience, to differentiate between "A" and "B" ports, and between ports of different devices. Furthermore, for expandable MCS devices, the terms "common ports" and "add/drop ports" are used. The term "common ports" refers to "A" ports, and the term "add/drop ports" refers to "B" ports.

Figure 1:
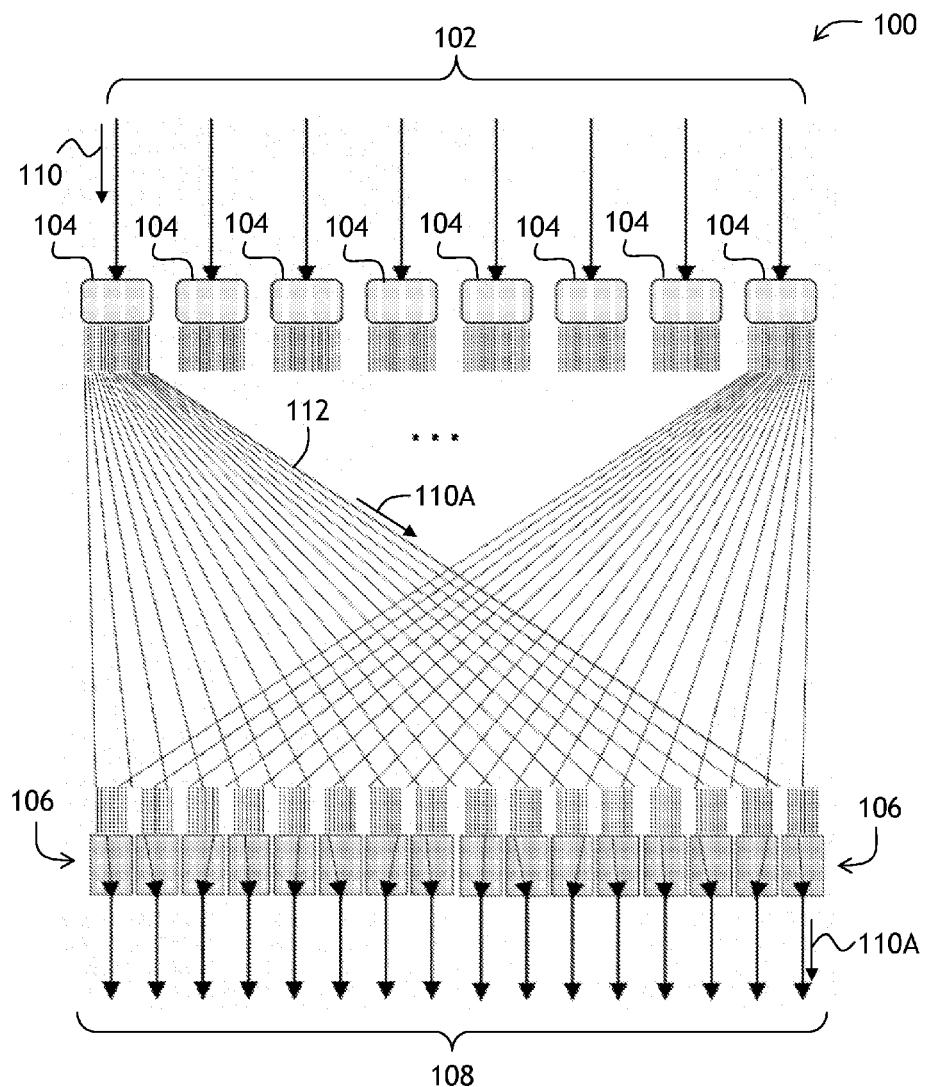
FIG. 1 is a schematic view of a prior-art 8×16 MCS.
Figure 2:
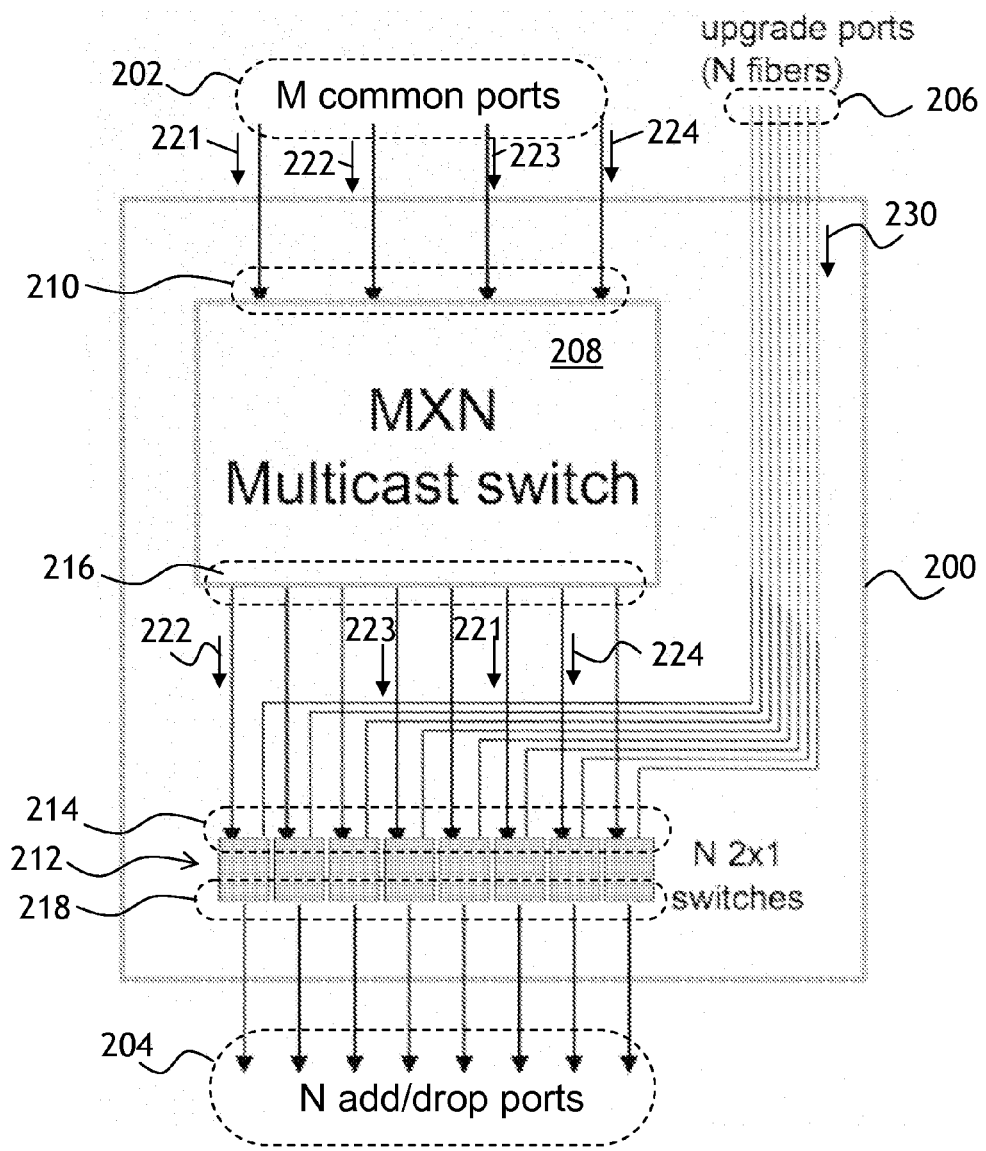
FIG. 2 is a schematic view of an expandable M×N MCS of the invention having N upgrade ports.

Referring now to FIG. 2, an expandable M×N MCS 200 includes M common ports 202, N add/drop ports 204, and N upgrade ports 206. The numbers M and N are integers ≥2. Typically, M is 4, 8, 16, or more ports, and N is 8, 16, 32, or more ports. By way of a non-limiting example, the expandable MCS 200 of FIG. 2 has 4 common ports 202, 8 add/drop ports 204, and 8 upgrade ports 206. The expandable M×N MCS 200 further includes a non-expandable M×N MCS 208 having M ingress ports 210, each of which being coupled to a unique one of the M common ports 202 of the expandable M×N multicast optical switch 200. Each of N 2×1 selector switches 212 is coupled at one of its entrance ports 214 (left-side ports in FIG. 2, denoted with an arrow) to a unique one of N egress ports 216 of the non-expandable M×N multicast optical switch 208. At its exit port 218, each of N 2×1 selector switches 212 is coupled to a unique one of the N add/drop ports 204 of the expandable M×N multicast optical switch 200. Each remaining entrance port 214 of each of the N 2×1 selector switches 212 is coupled to a unique one of the N upgrade ports 206.

In operation, optical signals 221, 222, 223, and 224 are coupled each to a single one of the common ports 202 of the MCS 200. Each of the optical signals 221 to 224 can include a plurality of wavelength channels, and each of the optical signals 221 to 224 can be coupled to any of the egress ports 216 of the non-expandable MCS 208. Having received one of the optical signals 221 to 224, the 2×1 selector switches 212 can select either the one of the optical signals 221 to 224, or the 2×1 selector switches 212 can select an additional optical signal 230 coupled to a corresponding one of the upgrade ports 206.

Figure 3:
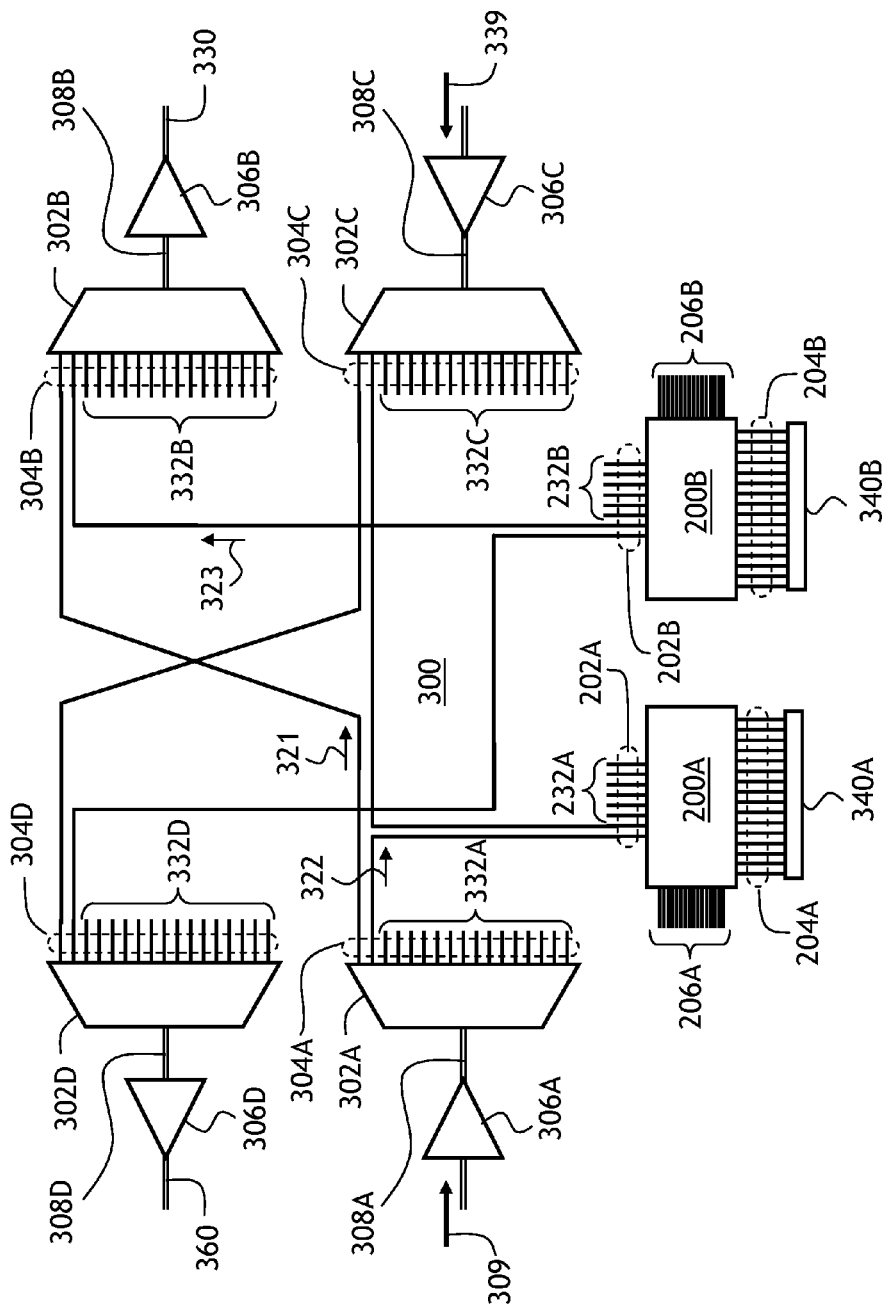
FIG. 3 is a schematic view of a reconfigurable add/drop multiplexor (ROADM) using two expandable M×N MCSs of FIG. 2.

Referring to FIG. 3 with further reference to FIG. 2, an east-west, west-east ROADM 300 includes first and second expandable M×N MCS 200A and 200B, respectively. The MCS 200A and 200B are implementations of the upgradeable MCS 200 of FIG. 2. The MCS 200A and 200B have common ports 202A and 202B; add/drop ports 204A and 204B; and upgrade ports 206A and 206B, respectively. For simplicity and without limitation, the L parameter of the MCS 200A and 200B is equal to one.

The ROADM 300 further includes first and second 1×(M+1) input WSS 302A and 302C, respectively; and first and second (M+1)×1 output WSS 302B and 302D, respectively. One of M+1 output ports 304A of the first input WSS 302A is coupled to one of M+1 input ports 304B of the first output WSS 302B, and one of M+1 output ports 304C of the second input WSS 302C is coupled to one of M+1 input ports 304D of the second output WSS 302D. A first one of the remaining M output ports 304A and 304C of the first 302A and second 302C input WSS is coupled to first and second of the M common ports 202A, respectively, of the first expandable M×N MCS 200A. A first one of the remaining M output ports 304B and 304D of the first 302B and second 302D output WSS is coupled to first and second of the M common ports 202B, respectively, of the second expandable M×N MCS 200B.

Optional first to fourth optical amplifiers 306A, 306B, 306C, and 306D are coupled to an input port 308A, an output port 308B, an input port 308C, and an output port 308D of the WSS 302A, 302B, 302C, and 302D, respectively, to compensate for optical losses in the ROADM 300. Further, optional N coherent optical receivers 340A are each coupled to a unique one of the N add/drop ports 204A of the first expandable M×N MCS 200A, and optional N transmitters 340B are each coupled to a unique one of the N add/drop ports 204B of the second expandable M×N MCS 200B.

In operation, a west-east WDM optical signal 309 (left side of FIG. 3) gets amplified by the first optical amplifier 306A and enters the first input WSS 302A. The first input WSS 302A splits the optical signal 302 into two portions: a first portion 321, including some wavelength channels, travels to the first output WSS 302B for subsequent transmission; and a second portion 322, including some other wavelength channels intended for a local drop, are directed towards the first MCS 200A, which then redistributes it between the coherent receivers 340A. At the same time, an added optical signal 323 is generated by combining in the second MCS 200B individual wavelength channels generated by the transmitters 340B, which is added in place of the dropped second portion 322. An east-west optical signal 339 (right side of FIG. 3) is handled in a similar fashion.

Free input ports 332A and 332C of the first and second input WSS 302A and 302C, respectively; free output ports 332B and 332D of the first and second output WSS 302B and 302D, respectively; and free common ports 232A and 232B of the first 200A and second 200B MCS, respectively, are used for future upgrades of the ROADM 300 to accommodate other directions. For each new direction (e.g. north-south, south-north) four more WSS are added, which are interconnected to each other via their free ports. Eventually, all the common ports of the MCS 200A and 200B become occupied. When that happens, the MCS 200A and 200B can be cascaded using the upgrade ports 206A and 206B.

Figure 4:
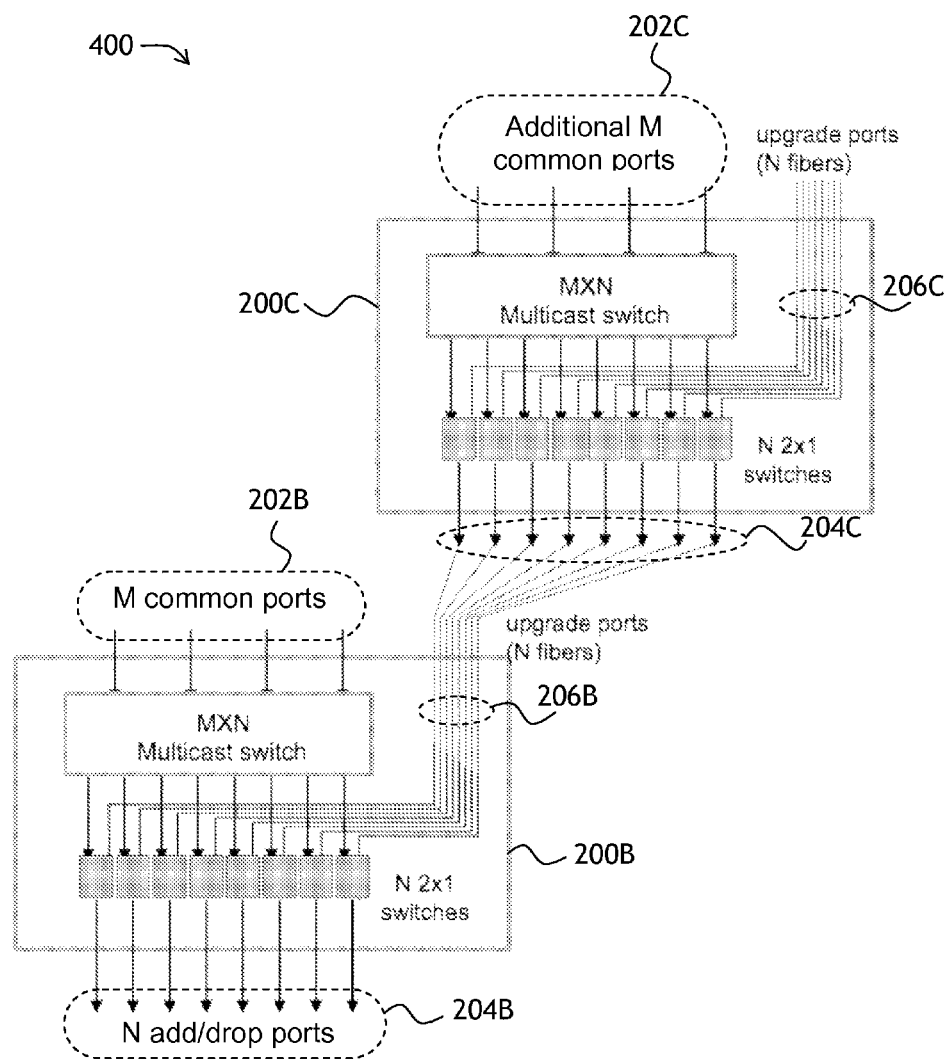
FIG. 4 is a schematic view of an expandable 2M×N MCS including two expandable M×N MCSs of FIG. 2.
Figure 5:
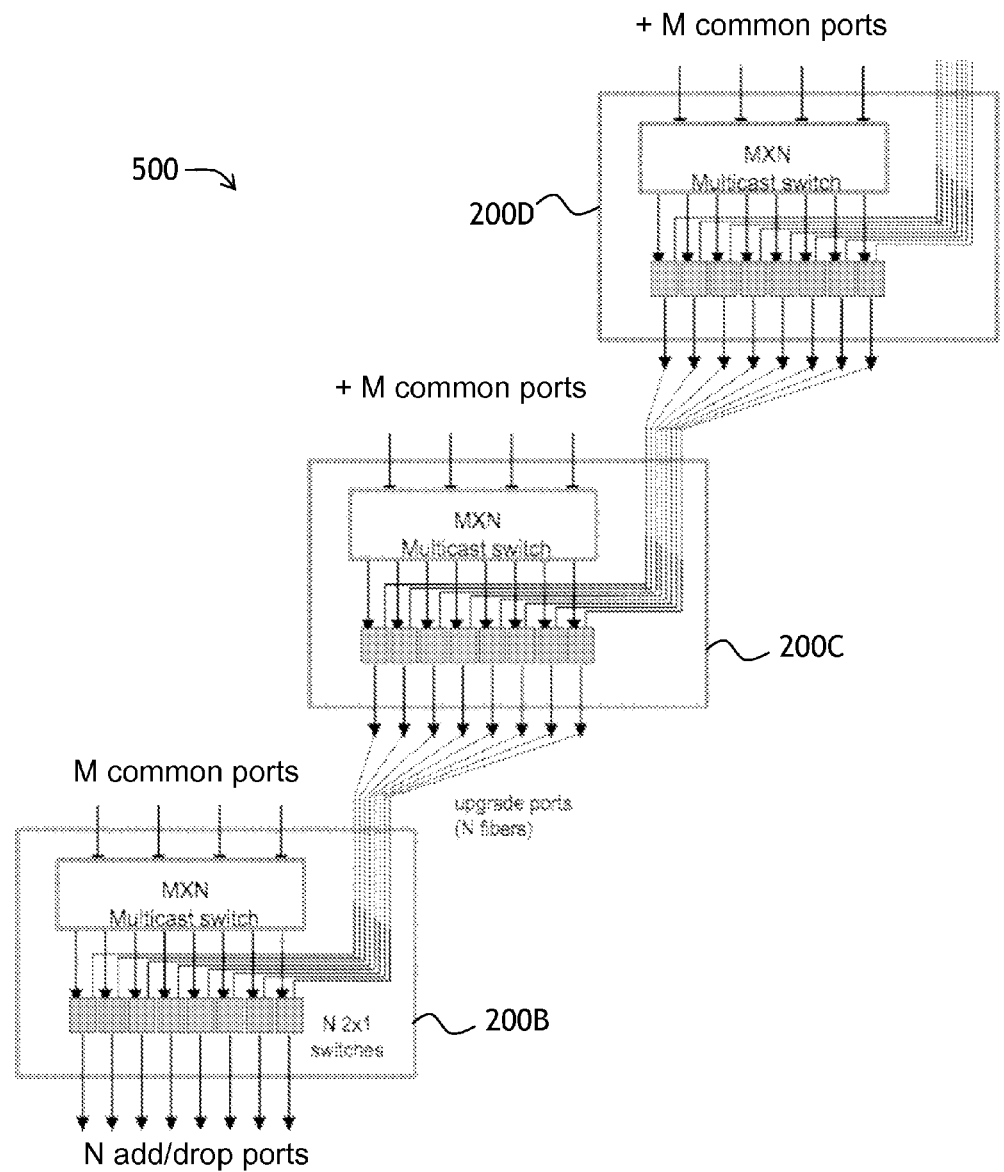
FIG. 5 is a schematic view of an expandable 3M×N MCS including three expandable M×N MCSs of FIG. 2.

The cascading can be done as follows. Referring to FIGS. 4 and 5 with further reference to FIGS. 2 and 3, a 2M×N optical switch 400 includes the expandable M×N multicast optical switch 200B of FIG. 3 and an additional expandable multicast M×N MCS 200C having each of its N add/drop ports 204C coupled to a unique one of the N upgrade ports 206B. As a result, the number of the common ports increases from M to 2M: the M common ports 202B plus M common ports 202C of the additional expandable M×N MCS 200C. Since the additional M×N MCS 200C is also expandable, another M×N MCS 200D can be added to increase the number of the common ports from 2M to 3M in a 3M×N MCS 500 (FIG. 5). More MCS can be added, as long as the insertion loss does not become impractically high. Of course, regular M×N optical switches, such as the non-expandable MCS 208 of FIG. 2, can also be connected to the N upgrade ports 206B or 206C, when further upgradeability is no longer required. This flexibility allows network architects to utilize same standardized versions of the expandable M×N MCS 200 at a variety of nodes of an optical network, where the requirements for the total number of added/dropped channels vary from node to node. When the ROADM 300 is upgraded to accommodate newly added optical communications directions, e.g. north-south and so on, the upgrade ports 206A and 206B allow expanding the total number of common ports by allowing the connection of an additional MCS. Notably, the above described expansion can be performed without interrupting existing services.

Figure 6A:
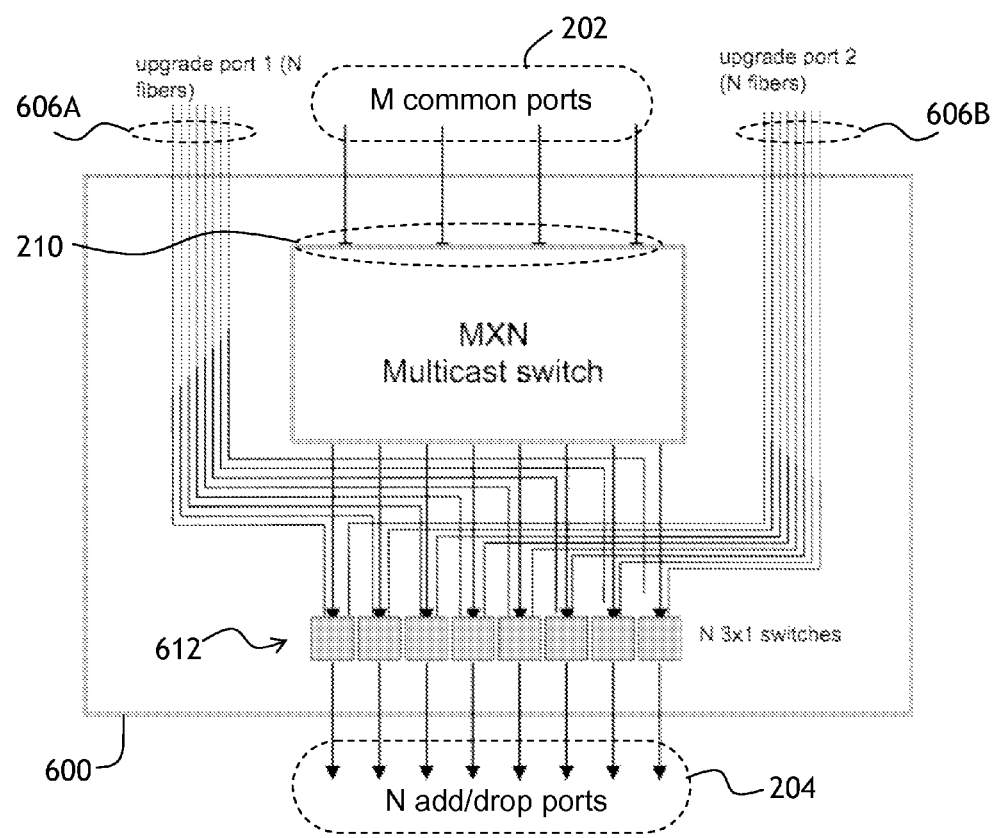
FIG. 6A is a schematic view of an expandable M×N MCS of the invention having 2N upgrade ports.
Figure 6B:
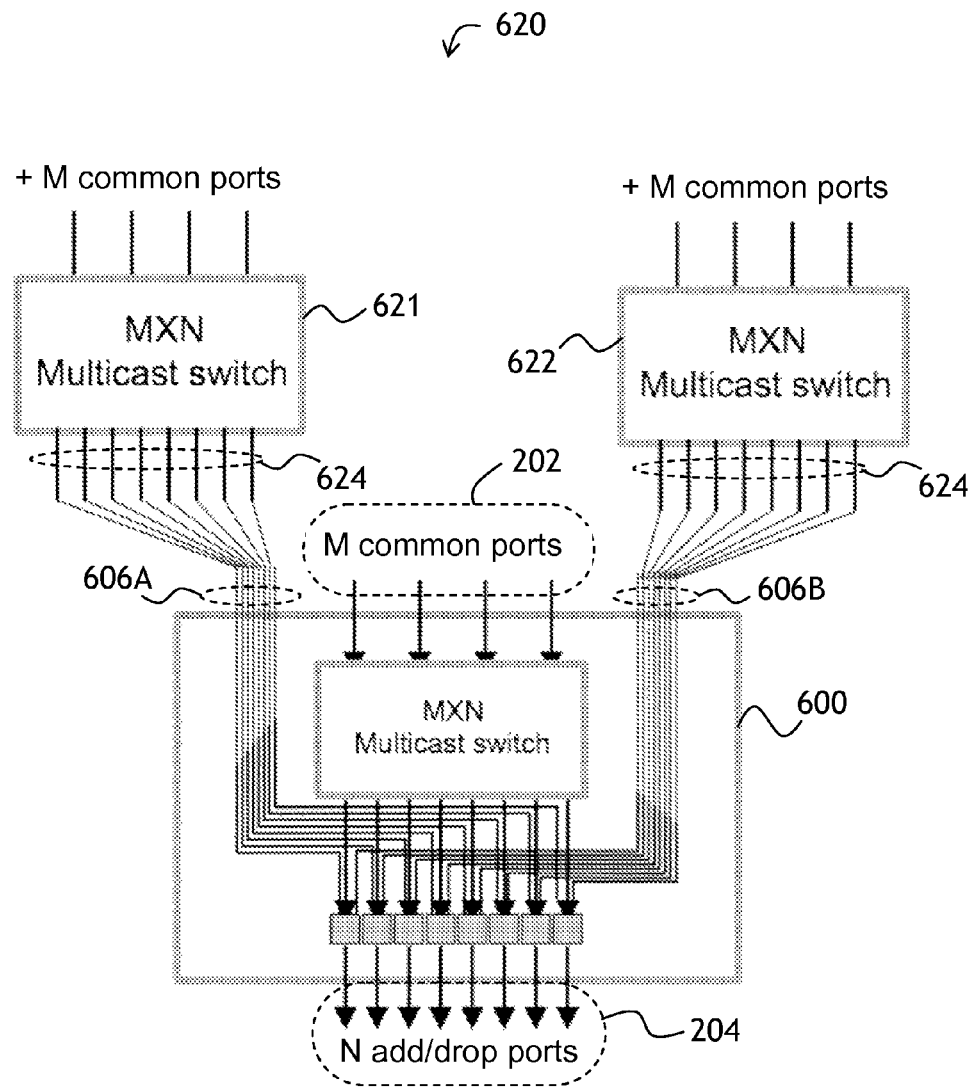
FIG. 6B is a schematic view of a 3M×N MCS including two regular MCSs and one expandable M×N MCSs of FIG. 6A.

Turning now to FIG. 6A with further reference to FIG. 2, an expandable M×N MCS 600 is similar to the expandable M×N MCS 200 of FIG. 2, having the M common ports 202 and the N add/drop ports 204. One difference is that the M×N MCS 600 of FIG. 6, not N 2×1 but N 3×1 selector switches 612 are used, allowing for not N but 2N upgrade ports, N upgrade ports 606A plus N upgrade ports 606B. Referring to FIG. 6B with further reference to FIG. 2, a 3N×M optical switch 620 can be constructed including the expandable M×N MCS 600 and first 621 and second 622 additional multicast M×N optical switches each having each of its N add/drop ports 624 coupled, one-to-one, to a unique one of the 2N upgrade ports 606A and 606B. Of course, another expandable M×N MCS optical switch, such as the MCS 200 of FIG. 2, can be used in place of either one or both first 621 and second 622 additional multicast M×N optical switches, allowing for future port count expansion.

According to the invention, the number of entrance ports of the selector optical switches 612 can be further increased to accommodate more upgrade ports, if so required. Referring back to FIGS. 2 and 6A, N (L+1)×1 selector optical switches (not shown) can be used in place of the 2×1 selector optical switches 212 (FIG. 2) or 3×1 selector optical switches 612 (FIG. 6A). Generally, L is an integer ≥1, so that the expandable M×N multicast optical switch 200 would have L*N upgrade ports 206. Just as the 2×1 selector optical switches 212 (FIG. 2) and 3×1 selector optical switches 612 (FIG. 6), these N (L+1)×1 selector optical switches are each coupled at one of its entrance ports to a unique one of N egress ports 216 of the non-expandable MCS 208, and at its exit port to a unique one of the N add/drop ports 204 of the expandable MCS 200. Each of the remaining L entrance ports of each of the N (L+1)×1 selector optical switches is then coupled to a unique one of the L*N upgrade ports.

The (L+1)×1 selector optical switches can be implemented using a variety of technologies, including without limitation a liquid crystal on silicon (LCoS), a micro-electro-mechanical system (MEMS), or a planar lightwave circuit (PLC) optical switches or arrays of such switches.

Figure 7:
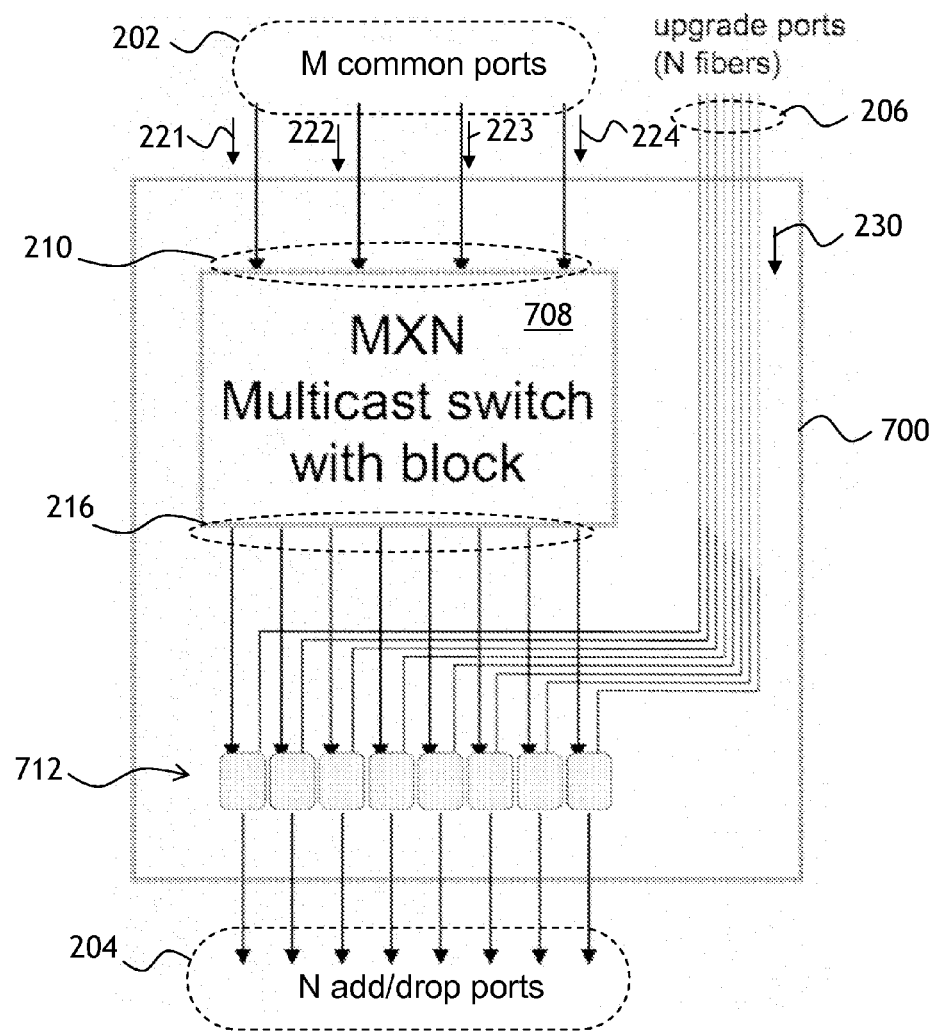
FIG. 7 is another embodiment of an expandable M×N MCS of FIG. 2 having N upgrade ports.

According to an aspect of the invention, the (L+1)×1 selector optical switches in an expandable MCS can be replaced with optical splitters or combiners, or generally by (L+1)×1 optical couplers including e.g. optical switches or optical splitters/combiners. Turning to FIG. 7 with further reference to FIG. 2, an expandable M×N MCS 700 is similar to the expandable M×N MCS 200 of FIG. 2. One difference is that the M×N MCS 700 of FIG. 7, the 2×1 selector optical switches 212 are replaced with 2×1 optical combiners 712. In this embodiment, it is preferable that a non-expandable MCS 708 have a "blocking" capability, that is, its output selector switches, not shown, have a position where all input signals are blocked, thus avoiding interference of the optical signals 221 to 224 when the additional optical signal 230 is coupled to corresponding upgrade ports 206. Alternatively, external blocking means (not shown) can be provided on the upgrade ports 206.

Figure 8:
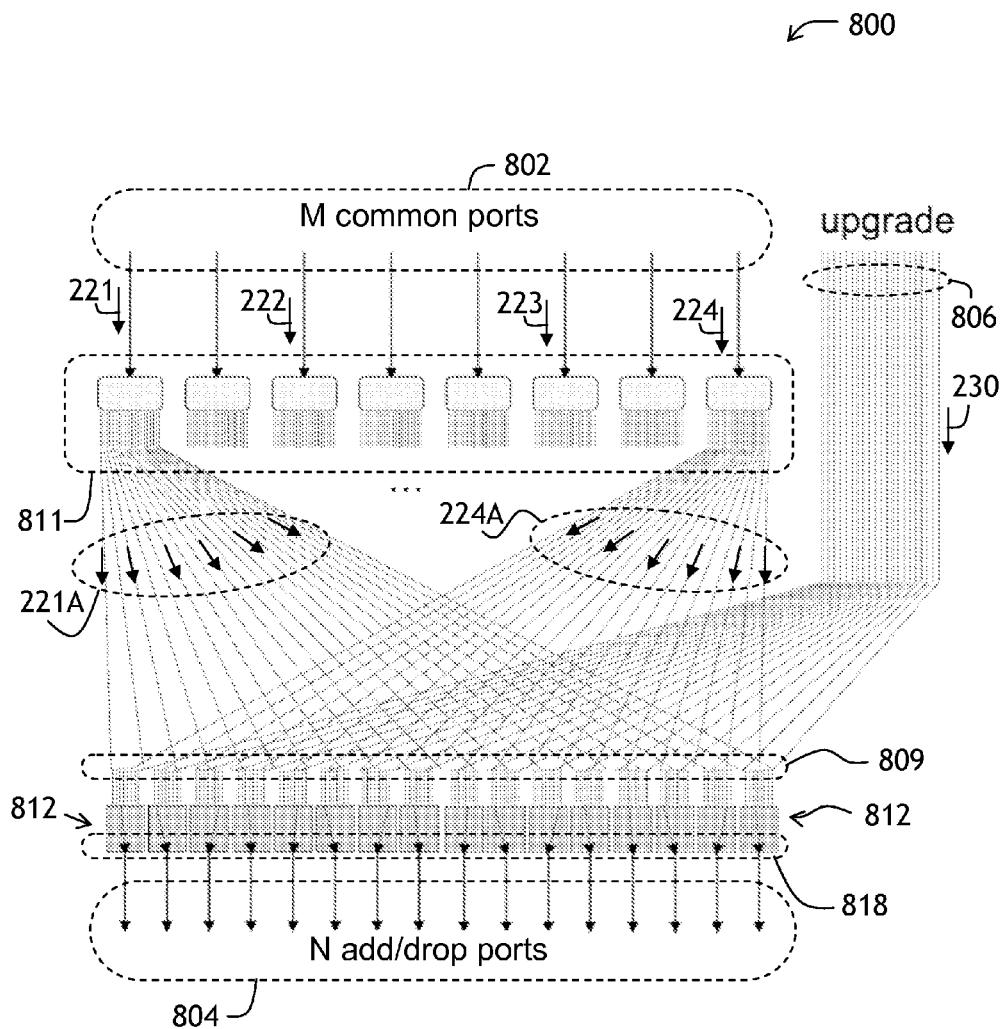
FIG. 8 is another embodiment of an expandable M×N MCS of the invention.

In one embodiment of the invention, the (L+1)×1 selector optical switches of an expandable MCS are combined with the selector optical switches of the non-expandable MCS, to reduce the total number of switches, resulting in a more compact construction. Referring to FIG. 8, an expandable M×N MCS 800 includes M common ports 802, N add/drop ports 804, and L*N upgrade ports 806 (only N upgrade ports 806 are shown, which corresponds to L=1). Generally, the numbers M and N are integers ≥2, and L is an integer ≥1. The expandable M×N MCS 800 further includes N (M+L)×1 selector optical switches 812 (2×1 switches are shown for simplicity). Each of the N (M+L)×1 selector optical switches 812 is coupled at its exit port 818 to a unique one of the N add/drop ports 804 of the expandable M×N multicast optical switch 800. An optical splitter 811 is coupled to the M common ports 802 of the expandable M×N multicast optical switch 800, for coupling each of the M common ports 802 to a unique one of entrance ports 809 of each of the N selector optical switches 812. Each of the remaining L entrance ports 809 of each of the N selector optical switches 812 is coupled to a unique one of the L*N upgrade ports 806.

In operation, the optical signals 221 to 224 are coupled individually to some of the M common ports 802. The optical splitter 811 splits each optical signal 221 to 224 into N portions, one for coupling to each of the N (M+L)×1 selector optical switches 812. Only portions 221A and 224A of the first 221 and fourth 224 optical signal are shown for simplicity. The role of the N (M+L)×1 selector optical switches 812 is to select a single one of the M common ports 802, from which to receive one of the optical signal portions 221A to 224A. Each of the N (M+L)×1 selector optical switches 812 also has a position corresponding to receiving the additional optical signal 230 from the corresponding one of the upgrade ports 806. Thus, the expandable M×N MCS 800 operates similarly to the expandable M×N MCS 200 of FIG. 2, but does not require the separate 2×1 switches array 212.

The M×N MCS 800 can be cascaded in a same manner as shown in FIGS. 4, 5, and 6B for the expandable M×N MCS 200 of FIG. 2, and the expandable M×N MCS 200A, B of FIG. 3. Specifically, a 2M×N optical switch can be constructed including the expandable M×N multicast optical switch 800 of FIG. 8. For simplicity, the L parameter is equal to one, although generally L is an integer ≥1. An additional multicast M×N optical switch 800 (or another type MCS) can be provided having each of its N add/drop ports 804 coupled to a unique one of the N upgrade ports 806, similarly to the 2M×N MCS 400 FIG. 4. A 3M×N optical switch can be constructed including the expandable M×N multicast optical switch 800 of FIG. 8, with the L parameter equal to 2. Two additional multicast M×N optical switches 800 (or another type MCS, e.g. the MCS 621 and 622 of FIG. 6B) can be provided, each having each of its N add/drops 804 coupled, one-to-one, to a unique one of the 2N upgrade ports 806 of the MSC 800, similarly to the 3M×N MCS 620 of FIG. 6B.

The N (M+L)×1 selector optical switches 812 can be implemented using a variety of technologies, including without limitation a liquid crystal on silicon (LCoS), a micro-electro-mechanical system (MEMS), or a planar lightwave circuit (PLC) optical switches or arrays of such switches. The optical splitter 811 can include a single diffractive optical element, such as a diffractive beamsplitter, or a PLC including an array of optical splitters.

Still referring to FIG. 8, with further reference to FIG. 3, a ROADM can be constructed using two expandable M×N MCS 800 of FIG. 8 in place of two M×N MCS 200A and 200B in the ROADM 300 of FIG. 3. The connection of the M×N MCS 800 is identical to that of the MCS 200A and 200B.

Figure 9:
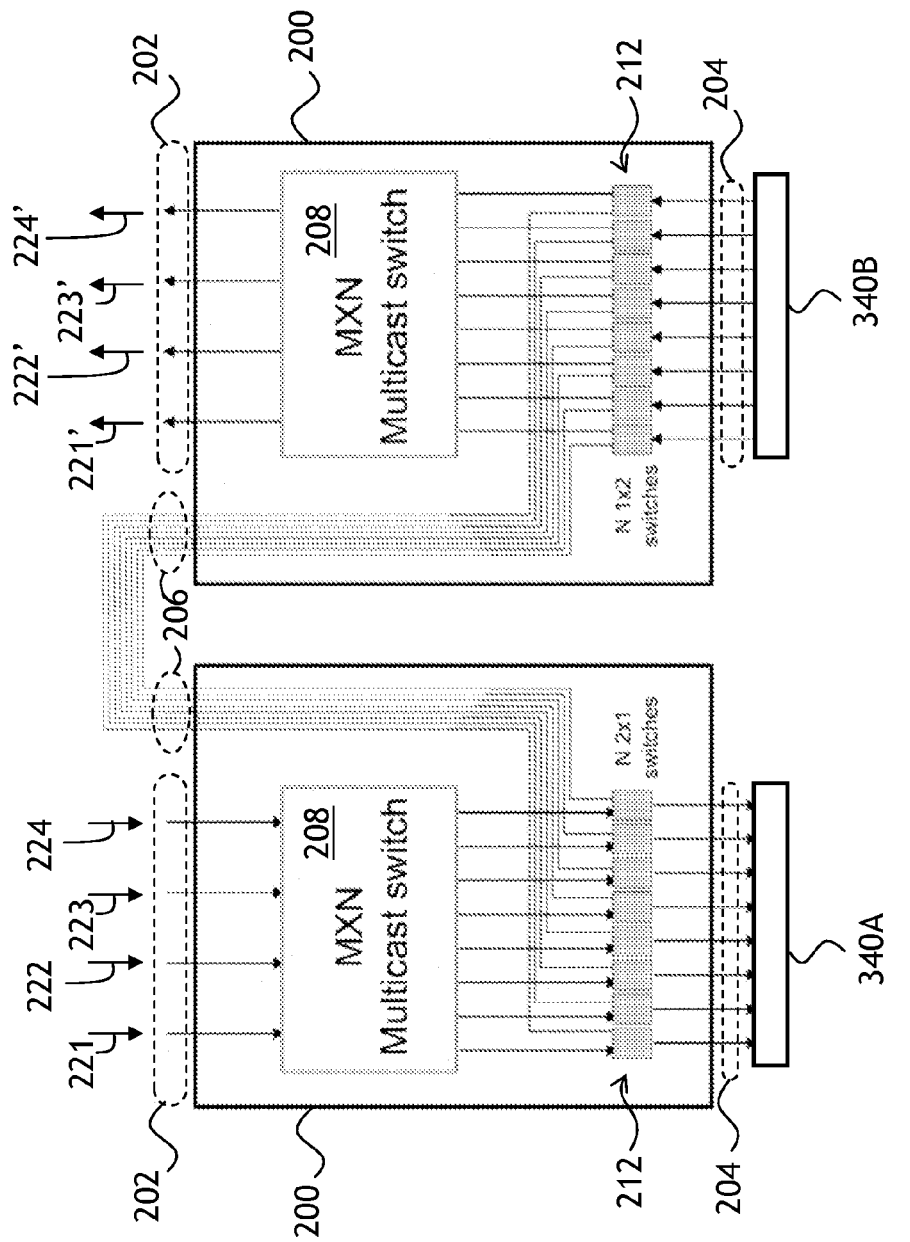
FIG. 9 is a schematic view of two M×N MCS of FIG. 2 having expansion ports connected back-to-back for a loopback capability.

Expandable M×N MCS 200 of FIG. 2 and M×N MCS 800 of FIG. 8 have yet another advantageous feature. For diagnostic purposes, it is desirable that a ROADM have a loopback capability for providing a switchable direct connection between its transmitters and receivers. Such a loopback capability can be used for testing transmitters, receivers, modulating/demodulating electronic circuitry, etc., while the ROADM continues to carry the normal through traffic. Referring to FIG. 9, two expandable M×N multicast optical switches 200 of FIG. 2 are connected via their expansion ports 206 to provide the loopback capability. More specifically, N of the L*N upgrade ports 206 of one of the two expandable M×N multicast optical switches 200 are coupled one-to-one to N of the L*N upgrade ports 206 of the other of the two expandable M×N multicast optical switches 200. During normal operation, the optical signals 221 to 224 are dropped to respective add/drop ports of the left-side MCS 200, and new optical signals 221' to 224' are added from the add/drop ports of the right-side MCS 200. Whenever the receivers 340A and transmitters 340B need to be tested, the 2×1 switches 212 are placed in the position where the respective upgrade ports 206 of the two MCS 200 are connected to each other, thus directly connecting the transmitters 340B to the respective receivers 340A. The upgrade ports 806 of two of the M×N MCS 800 of FIG. 8 can also be connected to provide the loopback capability illustrated in FIG. 9.

Figure 10:
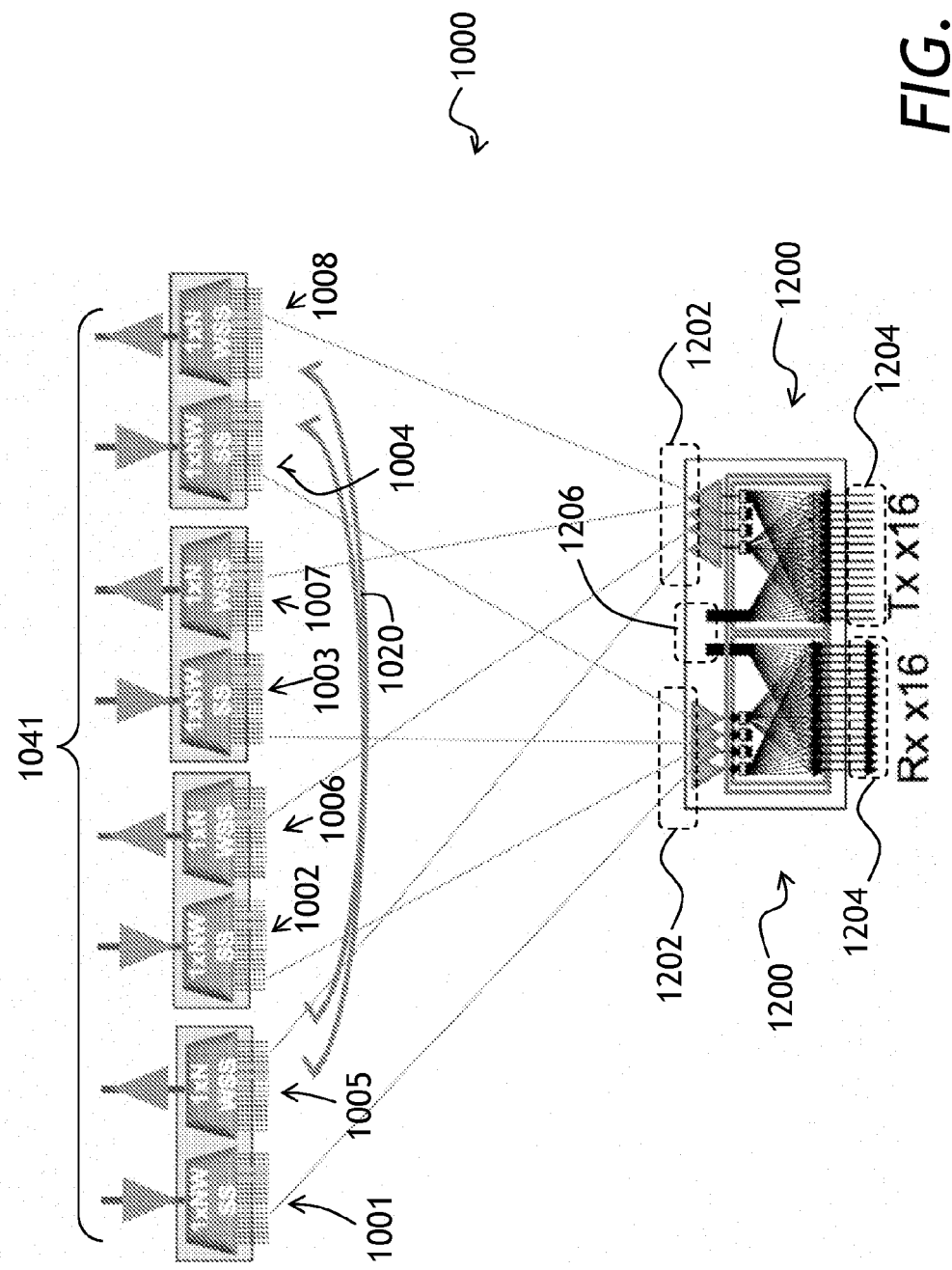
FIG. 10 is a schematic view of a four-direction ROADM using two expandable M×N MCSs of FIG. 2, FIG. 7, or FIG. 8.

An example of the upgrade capability of the MCS 200 of FIG. 2, MCS 700 of FIG. 7, and MCS 800 of FIG. 8 will now be given. Referring to FIG. 10, a ROADM 1000 routes optical signals between four directions 1041. For each of the four directions, a pair of 1×N and N×1 WSS is provided, including first to fourth input WSS 1001 to 1004, and first to fourth output WSS 1005 to 1008. Single-fiber connections between the WSS 1001 to 1008 are represented by lines 1020. These single-fiber connections are similar to the single-fiber connections between the WSS 302A to 302D in FIG. 3. Referring back to FIG. 10, a pair of expandable MCS 1200, equivalent to the MCS 200 of FIG. 2, MCS 700 of FIG. 7, and MCS 800 of FIG. 8, are provided. Each of the MCS 1200 has four common ports 1202 and sixteen add/drop ports 1204 for connecting to arrays of receivers (Rx) and transmitters (Tx). The MCS 1200 are connected to each of the eight WSS 1001 to 1008 via dedicated individual common ports 1202. All the common ports 1202 are used up in the ROADM 1000. According to the invention, upgrade ports 1206 of the MCS 1200 can be used to accommodate more network directions.

Figure 11:
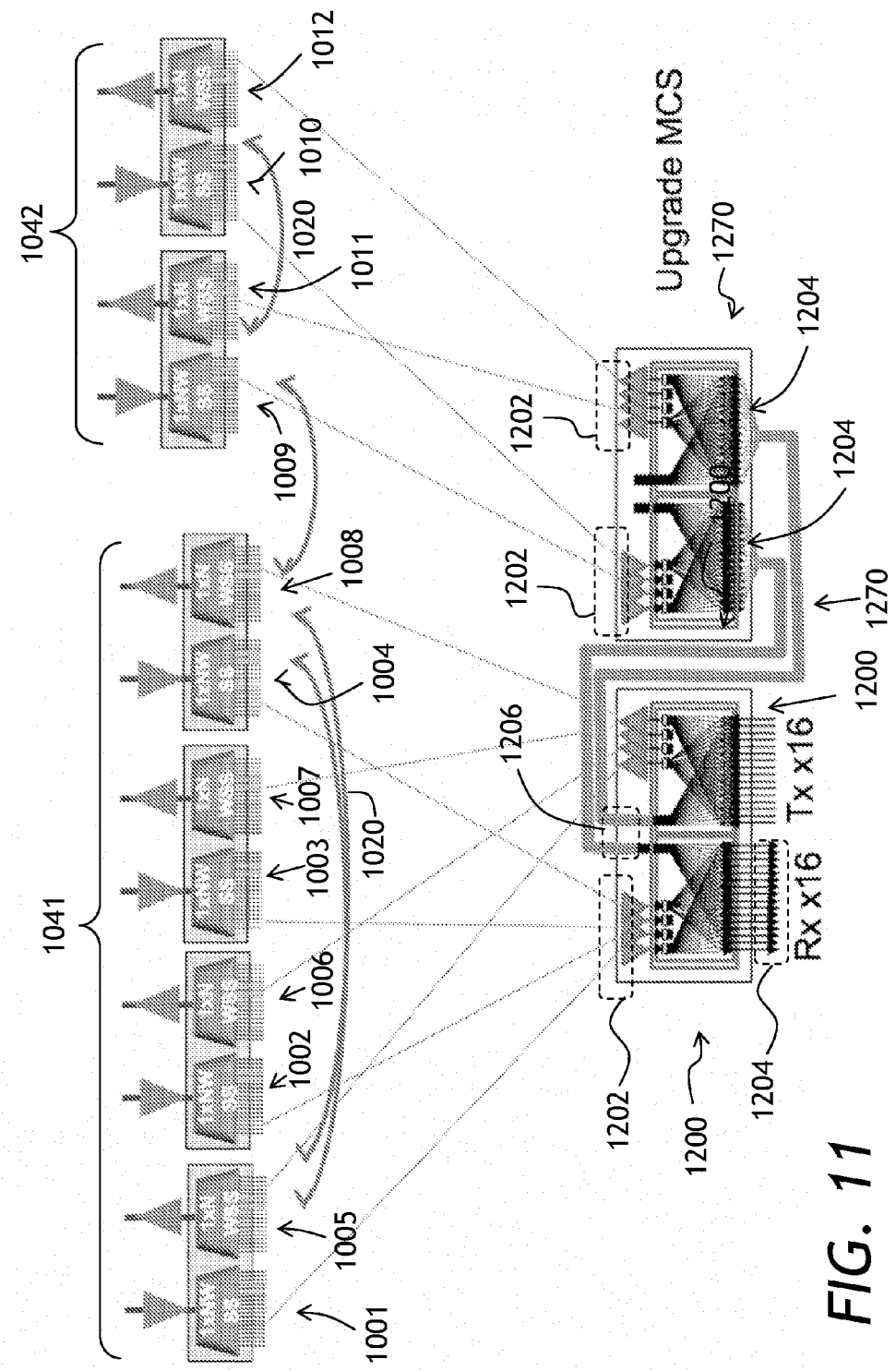
FIG. 11 is a schematic view of a six-direction ROADM obtained by expanding the two M×N MCS of FIG. 10.

Turning to FIG. 11, the ROADM 1100 is expanded to accommodate two additional directions 1042. To that end, third and fourth expandable MCS 1270 are provided. Each add/drop port of the third and fourth expandable MCS 1270 is coupled to a unique one of the upgrade ports 1206 of the first and second expandable MCS 1200, respectively.

Fifth and sixth input WSS 1009 and 1010, and fifth and sixth output WSS 1011 and 1012, respectively, are further provided. The WSS 1009 to 1012 are connected via the single-fiber connections 1020.

The ROADM 300 of FIG. 3, when using any of the expandable MCS 200 of FIG. 2, MCS 700 of FIG. 7, and MCS 800 of FIG. 8 in place of the MCS 200A and/or 200B, can be similarly expanded to accommodate additional directions. Briefly, third and fourth expandable MCS (not shown in FIG. 3) can be added. Each add/drop port of the third and fourth expandable MCS is coupled to a unique one of the upgrade ports of the first and second expandable MCS, respectively. Third and fourth 1×(M+1) input WSS and third and fourth (M+1)×1 output WSS are also provided (not shown in FIG. 3) to accommodate the added direction. One of the M+1 output ports of the third input WSS is coupled to one of the M+1 input ports of the third output WSS, and one of the M+1 output ports of the fourth input WSS is coupled to one of the M+1 input ports of the fourth output WSS. A first one of the remaining M output ports of the third and fourth input WSS is coupled to first and second of the M common ports of the third expandable M×N MCS, respectively, and a first one of the remaining M output ports of the third and fourth output WSS is coupled to first and second of the M common ports of the fourth expandable MCS, respectively.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An expandable M×N multicast optical switch comprising:
- M common ports, N add/drop ports, and L*N upgrade ports, wherein M and N are integers ≥2, and L is an integer ≥1;
- a non-expandable M×N blocking multicast optical switch comprising M ingress ports each coupled to a unique one of the M common ports, and N egress ports; and
- N (L+1)×1 optical splitters/combiners each comprising L+1 entrance ports and one exit port, wherein each one of the N (L+1)×1 optical splitters/combiners has one of the entrance ports coupled to a unique one of the N egress ports, and the exit port coupled to a unique one of the N add/drop ports;
- wherein each one of the remaining L entrance ports of the N (L+1)×1 optical splitters/combiners is coupled to a unique one of the L*N upgrade ports.

2. A 2M×N optical switch comprising:
- the expandable M×N multicast optical switch of claim 1, wherein L=1; and
- an additional multicast M×N optical switch comprising M common ports and N add/drop ports, wherein each of the N add/drop ports of the additional multicast M×N optical switch is coupled to a unique one of the N upgrade ports.

3. A 3M×N optical switch comprising:
- the expandable M×N multicast optical switch of claim 1, wherein L=2; and
- first and second additional multicast M×N optical switches each comprising M common ports and N add/drop ports, wherein each of the N add/drop ports of the first and second additional multicast M×N optical switches is coupled to a unique one of the L*N upgrade ports.

4. An optical switch comprising two expandable M×N multicast optical switches of claim 1,
- wherein N of the L*N upgrade ports of one of the two expandable M×N multicast optical switches are coupled one-to-one to N of the L*N upgrade ports of the other of the two expandable M×N multicast optical switches, thus providing a loopback capability between the N add/drop ports of the two expandable M×N multicast optical switches.

5. An optical module comprising the expandable M×N multicast optical switch of claim 1 and N coherent receivers each coupled to a unique one of the N add/drop ports.

6. An expandable M×N multicast optical switch comprising:
- M common ports, N add/drop ports, and 2N upgrade ports, wherein M and N are integers ≥2;
- N (M+L)×1 selector optical switches each comprising M+L entrance ports, and an exit port coupled to a unique one of the N add/drop ports;
- an optical splitter coupled to the M common ports, for coupling each of the M common ports to a unique entrance port of each one of the N (M+L)×1 selector optical switches;
- wherein each of the remaining L entrance ports of each of the N (M+L)×1 selector optical switches is coupled to a unique one of the L*N upgrade ports; and
- first and second additional multicast M×N optical switches each comprising M common ports and N add/drop ports, wherein each of the N add/drop ports of the first and second additional multicast M×N optical switches is coupled to a unique one of the L*N upgrade ports.

7. The expandable M×N multicast optical switch of claim 6, wherein each selector optical switch is selected from the group consisting of a LCOS optical switch, a MEMS optical switch, and a PLC optical switch.

8. The expandable M×N multicast optical switch of claim 6, wherein the optical splitter comprises a diffractive optical element.

9. An optical module comprising the expandable M×N multicast optical switch of claim 6 and N coherent receivers each coupled to a unique one of the N add/drop ports.

10. A reconfigurable optical add/drop multiplexor comprising:
- first and second expandable M×N multicast optical switches, each comprising:
  - M common ports, N add/drop ports, and L*N upgrade ports, wherein M and N are integers ≥2, and L is an integer ≥1;
  - a non-expandable M×N multicast optical switch comprising M ingress ports each coupled to a unique one of the M common ports, and N egress ports; and
  - N (L+1)×1 optical couplers each comprising L+1 entrance ports and one exit port, wherein each one of the optical couplers has one of the entrance ports coupled to a unique one of the N egress ports, and the exit port coupled to a unique one of the N add/drop ports;
  - wherein each one of the remaining L entrance ports of the N (L+1)×1 optical couplers is coupled to a unique one of the L*N upgrade ports; and
- first and second 1×(M+1) input wavelength-selective optical switches, and first and second (M+1)×1 output wavelength-selective optical switches;
- wherein one of the M+1 output ports of the first input wavelength-selective optical switch is coupled to one of the M+1 input ports of the first output wavelength-selective optical switch, and one of the M+1 output ports of the second input wavelength-selective optical switch is coupled to one of the M+1 input ports of the second output wavelength-selective optical switch;
- wherein a first one of the remaining M output ports of the first and second input wavelength-selective optical switches is coupled to first and second of the M common ports of the first expandable M×N multicast optical switch, respectively; and
- wherein a first one of the remaining M output ports of the first and second output wavelength-selective optical switches is coupled to first and second of the M common ports of the second expandable M×N multicast optical switch, respectively.

11. The reconfigurable optical add/drop multiplexor of claim 10, further comprising N coherent optical receivers each coupled to a unique one of the N add/drop ports of the first expandable M×N multicast optical switch.

12. The reconfigurable optical add/drop multiplexor of claim 10, further comprising:
- third and fourth expandable M×N multicast optical switches, wherein each add/drop port of the third and fourth expandable M×N multicast optical switches is coupled to a unique one of the upgrade ports of the first and second expandable M×N multicast optical switches, respectively;
- third and fourth 1×(M+1) input wavelength-selective optical switches, and third and fourth (M+1)×1 output wavelength-selective optical switches;
- wherein one of the M+1 output ports of the third input wavelength-selective optical switch is coupled to one of the M+1 input ports of the third output wavelength-selective optical switch, and one of the M+1 output ports of the fourth input wavelength-selective optical switch is coupled to one of the M+1 input ports of the fourth output wavelength-selective optical switch;

wherein a first one of the remaining M output ports of the third and fourth input wavelength-selective optical switches is coupled to first and second of the M common ports, respectively, of the third expandable M×N multicast optical switch; and wherein a first one of the remaining M output ports of the third and fourth output wavelength-selective optical switches is coupled to first and second of the M common ports, respectively, of the fourth expandable M×N multicast optical switch.

13. A reconfigurable optical add/drop multiplexor comprising:

first and second expandable M×N multicast optical switches, each comprising:

M common ports, N add/drop ports, and L*N upgrade ports, wherein M and N are integers ≥2, and L is an integer ≥1;

N (M+L)×1 selector optical switches each comprising M+L entrance ports, and an exit port coupled to a unique one of the N add/drop ports; and an optical splitter coupled to the M common ports, for coupling each of the M common ports to a unique entrance port of each one of the N (M+L)×1 selector optical switches;

wherein each of the remaining L entrance ports of each of the N (M+L)×1 selector optical switches is coupled to a unique one of the L*N upgrade ports; and first and second 1×(M+1) input wavelength-selective optical switches, and first and second (M+1)×1 output wavelength-selective optical switches;

wherein one of the M+1 output ports of the first input wavelength-selective optical switch is coupled to one of the M+1 input ports of the first output wavelength-selective optical switch, and one of the M+1 output ports of the second input wavelength-selective optical switch is coupled to one of the M+1 input ports of the second output wavelength-selective optical switch;

wherein a first one of the remaining M output ports of the first and second input wavelength-selective optical switches is coupled to first and second of the M common ports of the first expandable M×N multicast optical switch, respectively; and wherein a first one of the remaining M output ports of the first and second output wavelength-selective optical switches is coupled to first and second of the M common ports of the second expandable M×N multicast optical switch, respectively.

14. The reconfigurable optical add/drop multiplexor of claim 13, further comprising N coherent optical receivers each coupled to a unique one of the N add/drop ports of the first expandable M×N multicast optical switch.

15. The reconfigurable optical add/drop multiplexor of claim 13, further comprising:

third and fourth expandable M×N multicast optical switches, and wherein each add/drop port of the third and fourth expandable M×N multicast optical switches is coupled to a unique one of the upgrade ports of the first and second expandable M×N multicast optical switches, respectively;

third and fourth 1×(M+1) input wavelength-selective optical switches, and third and fourth (M+1)×1 output wavelength-selective optical switches;

wherein one of the M+1 output ports of the third input wavelength-selective optical switch is coupled to one of the M+1 input ports of the third output wavelength-selective optical switch, and one of the M+1 output ports of the fourth input wavelength-selective optical switch is coupled to one of the M+1 input ports of the fourth output wavelength-selective optical switch;

wherein a first one of the remaining M output ports of the third and fourth input wavelength-selective optical switches is coupled to first and second of the M common ports, respectively, of the third expandable M×N multicast optical switch; and wherein a first one of the remaining M output ports of the third and fourth output wavelength-selective optical switches is coupled to first and second of the M common ports, respectively, of the fourth expandable M×N multicast optical switch.

* * * * *